(12) United States Patent
Mayville et al.

(10) Patent No.: US 8,172,262 B2
(45) Date of Patent: May 8, 2012

(54) INITIATOR HOUSING ASSEMBLY

(75) Inventors: Brian A. Mayville, Troy, MI (US);
Joshua D. VanHooser, Waterford, MI (US); Dale E. Tauchen, Clinton Township, MI (US)

(73) Assignee: TK Holdings, Inc., Armada, MI (US)

( * ) Notice: Subject to any disclaimer, the term of this patent is extended or adjusted under 35 U.S.C. 154(b) by 0 days.

(21) Appl. No.: 12/618,627

(22) Filed: Nov. 13, 2009

(65) Prior Publication Data

US 2010/0117345 A1   May 13, 2010

Related U.S. Application Data

(63) Continuation of application No. 61/199,171, filed on Nov. 13, 2008.

(51) Int. Cl.
*B60R 21/26* (2011.01)
(52) U.S. Cl. .................. 280/741; 280/736; 102/530
(58) Field of Classification Search .................. 280/741, 280/736; 102/530
See application file for complete search history.

(56) References Cited

U.S. PATENT DOCUMENTS

| 5,404,263 | A | | 4/1995 | Graves et al. ............... 361/247 |
|---|---|---|---|---|
| 6,007,096 | A | * | 12/1999 | Shirk et al. .................... 280/736 |
| 6,073,963 | A | | 6/2000 | Hamilton et al. ............. 280/741 |
| 6,644,198 | B1 | | 11/2003 | Avetisian et al. ........ 102/202.14 |
| 6,764,096 | B2 | * | 7/2004 | Quioc .......................... 280/736 |
| 6,830,264 | B2 | | 12/2004 | Al-Amin ...................... 280/736 |
| 6,871,873 | B2 | * | 3/2005 | Quioc et al. .................. 280/741 |
| 7,073,820 | B2 | * | 7/2006 | McCormick ................. 280/741 |
| 7,210,703 | B2 | | 5/2007 | Young et al. .................. 280/741 |
| 7,343,862 | B2 | * | 3/2008 | McCormick ................. 102/530 |
| 7,510,211 | B2 | | 3/2009 | Clark ........................... 280/741 |
| 7,568,728 | B2 | * | 8/2009 | Smith et al. .................. 280/736 |
| 7,614,875 | B2 | | 11/2009 | Katsuda et al. .............. 431/253 |
| 7,744,124 | B2 | * | 6/2010 | Yamazaki .................... 280/736 |
| 2005/0127649 | A1 | * | 6/2005 | Smith .......................... 280/741 |
| 2006/0033317 | A1 | * | 2/2006 | Stevens ........................ 280/741 |
| 2007/0273131 | A1 | * | 11/2007 | Smith et al. .................. 280/736 |
| 2008/0012278 | A1 | | 1/2008 | Yamazaki .................... 280/742 |
| 2009/0114109 | A1 | * | 5/2009 | Overton et al. .............. 102/200 |
| 2010/0194085 | A1 | * | 8/2010 | Mayville et al. ............. 280/741 |

* cited by examiner

*Primary Examiner* — Drew Brown
(74) *Attorney, Agent, or Firm* — L.C. Begin & Associates, PLLC.

(57) ABSTRACT

An initiator housing assembly includes a preformed initiator receiving portion defining a first cavity and a body portion affixed to the receiving portion and defining a second cavity. An opening leading into the first cavity is positioned within the second cavity. An initiator assembly, as gas generating system, and a vehicle occupant protection system incorporating the initiator housing assembly are also provided.

20 Claims, 3 Drawing Sheets

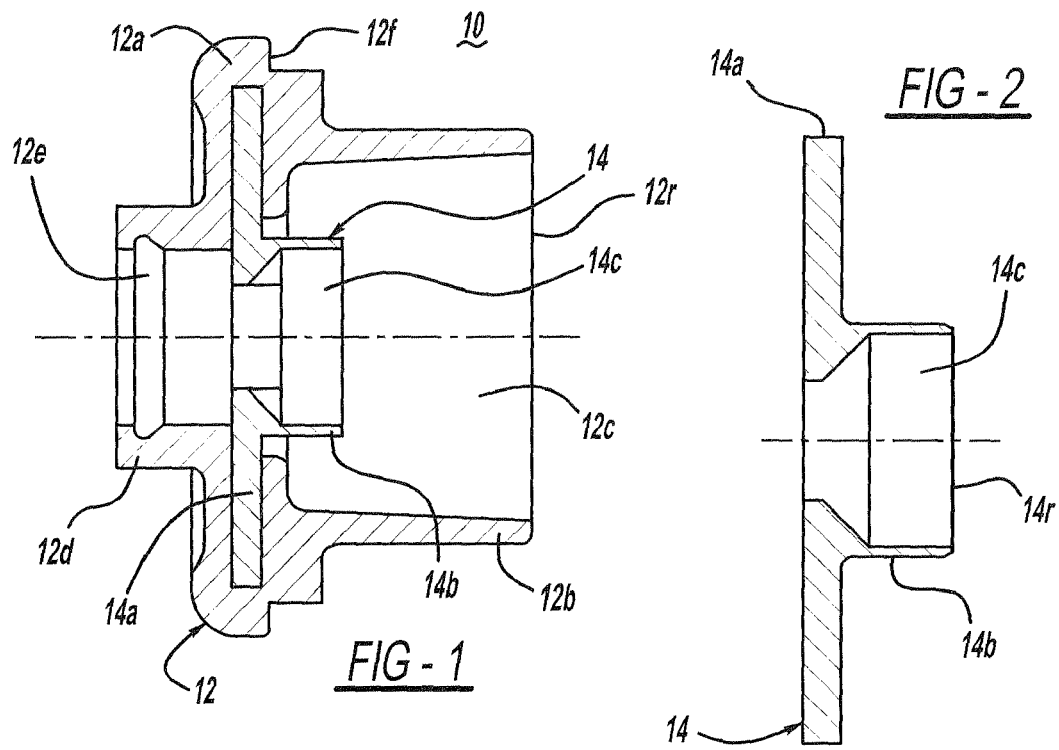
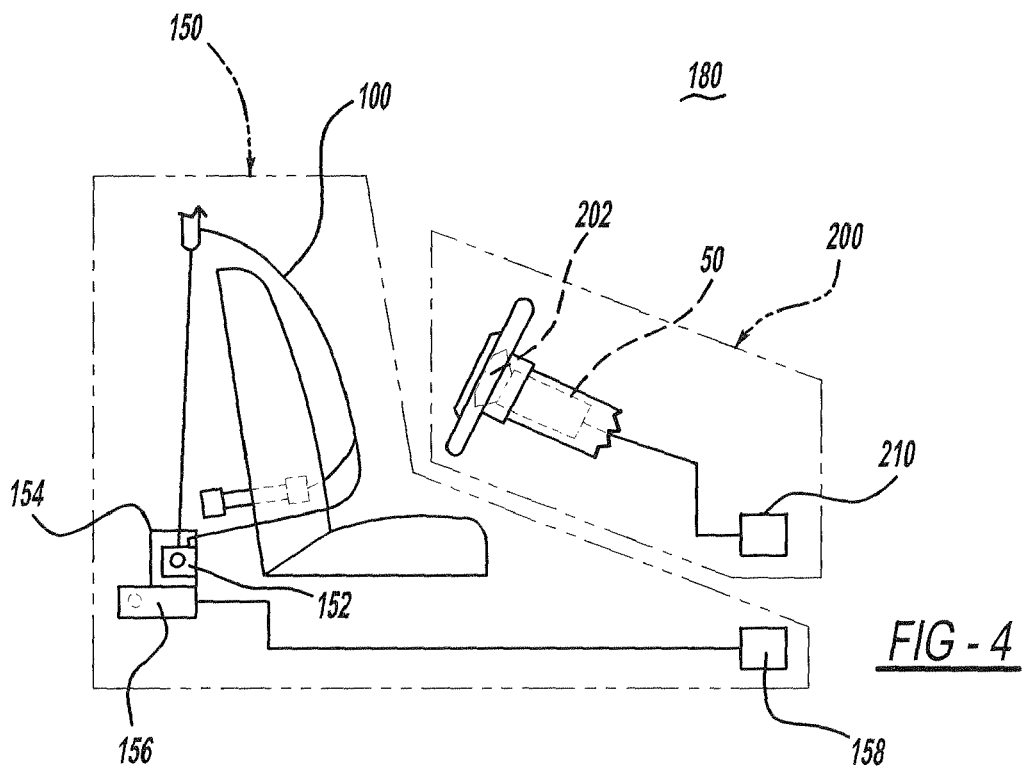

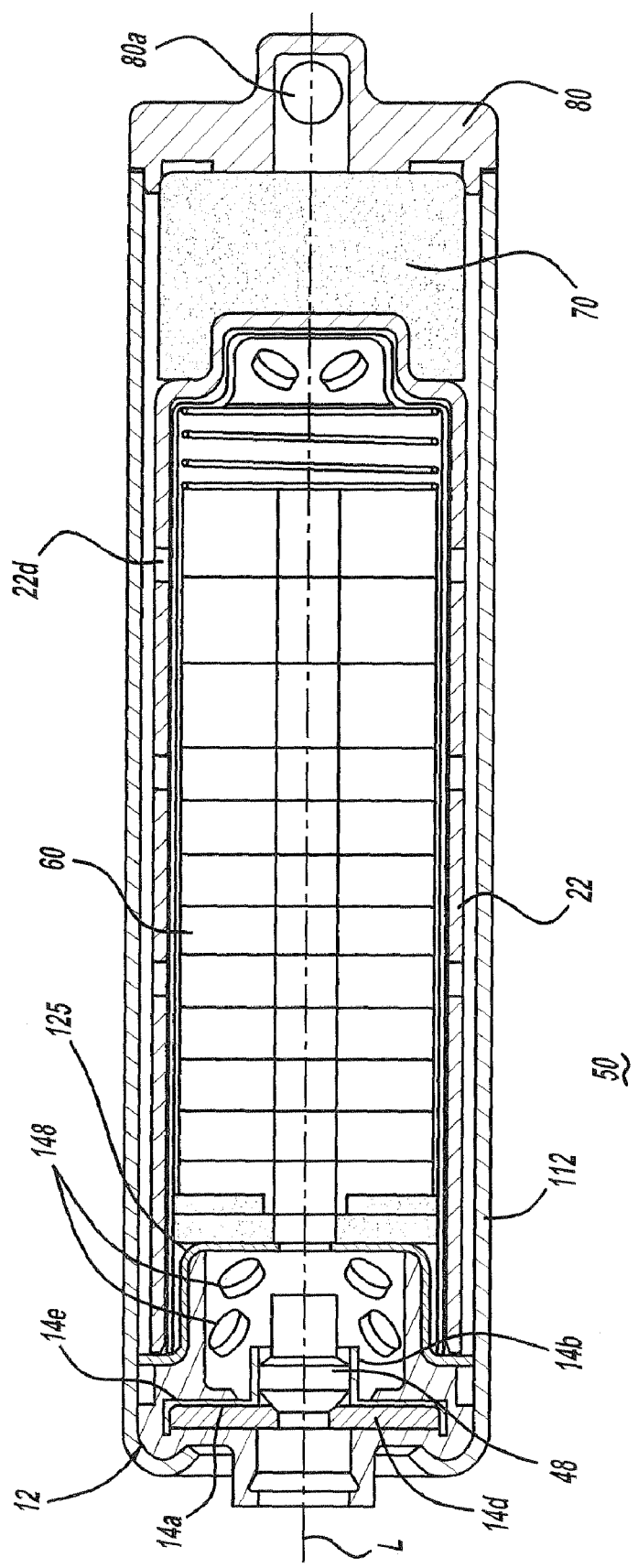

INITIATOR HOUSING ASSEMBLY

CROSS REFERENCE TO RELATED APPLICATIONS

This application claims the benefit of provisional application Ser. No. 61/199,171, filed on Nov. 13, 2008.

BACKGROUND OF THE INVENTION

The present invention relates generally to gas generating systems utilizing a gas generant material and an initiator for igniting the gas generant.

SUMMARY OF THE INVENTION

In one aspect of the embodiments of the present invention, an initiator housing assembly is provided including a preformed initiator receiving portion defining a first cavity, and a body portion affixed to the receiving portion and defining a second cavity. An opening leading into the first cavity is positioned within the second cavity.

In another aspect of the embodiments of the present invention, an initiator housing assembly is provided including a metallic initiator receiving portion and a body portion formed from a moldable material enclosing at least part of the receiving portion.

BRIEF DESCRIPTION OF THE DRAWINGS

FIG. 1 is a cross-sectional side view of an initiator housing assembly in accordance with one embodiment of the present invention.

FIG. 2 is a cross-sectional side view of an initiator receiving portion incorporated into the initiator housing assembly embodiment shown in FIG. 1.

FIG. 3 is a cross-sectional side view of a gas generating system incorporating an initiator housing assembly in accordance with one embodiment of the present invention.

FIG. 4 is a schematic representation of an exemplary vehicle occupant protection system incorporating an initiator housing assembly in accordance with an embodiment of the present invention.

DETAILED DESCRIPTION

Figure 5:
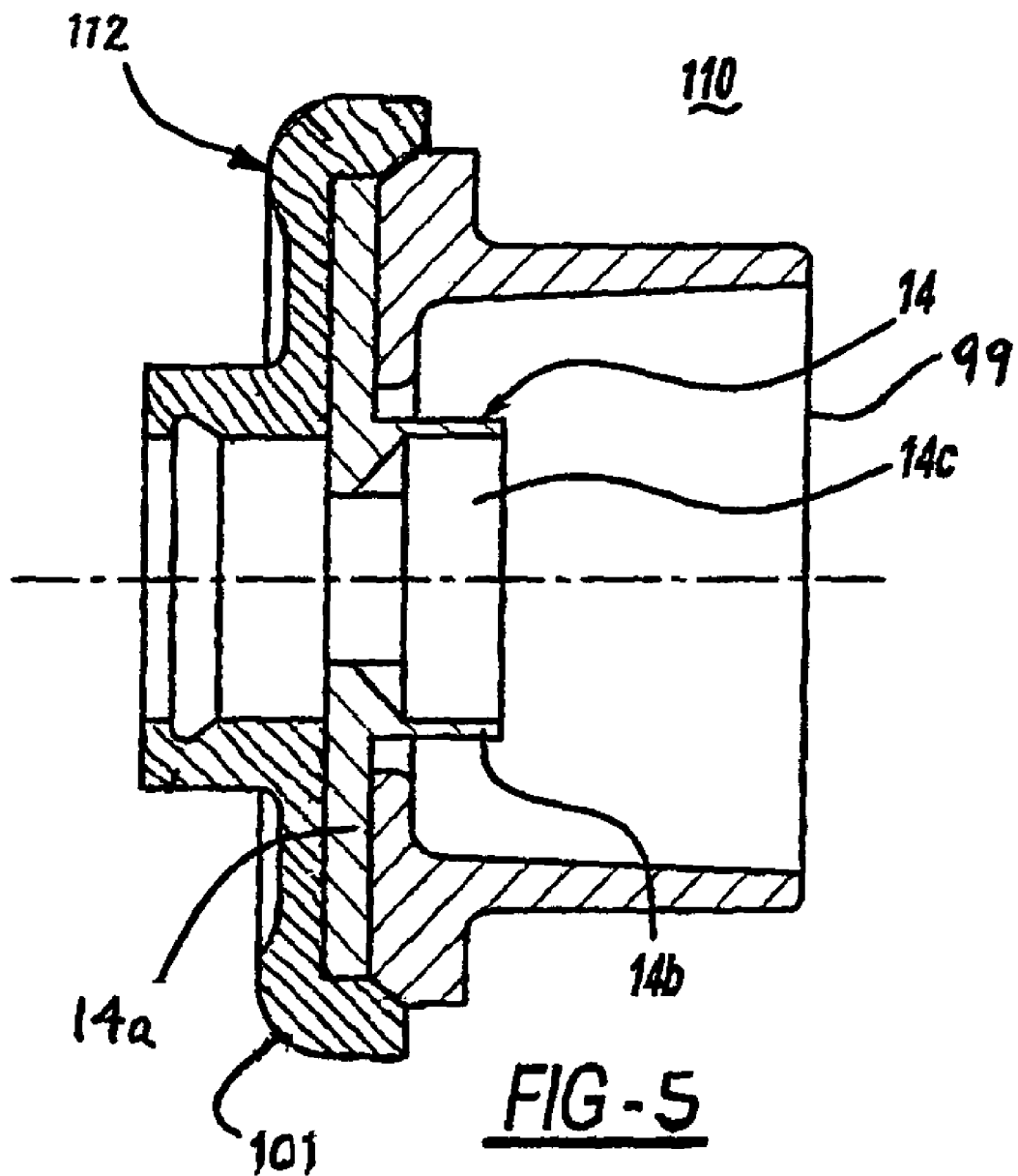
FIG. 5 is a cross-sectional side view of an initiator housing assembly in accordance with an alternative embodiment of the present invention.

FIG. 1 shows an embodiment of an initiator housing assembly 10 in accordance with one embodiment of the present invention. Assembly 10 includes a preformed initiator receiving portion 14 defining a first cavity 14c, and a body portion 12 affixed to the receiving portion 14 and defining a second cavity 12c. From FIG. 1, it is seen that an opening 14r leading into first cavity 14c is positioned within second cavity 12c.

In the embodiment shown in FIG. 1, initiator receiving portion 14 is secured to body portion 12 such that the body portion encloses a portion of initiator receiving portion 14. Thus, at least part of initiator receiving portion 14 is embedded or enclosed within body portion 12.

Referring again to FIG. 1, body portion 12 includes a base portion 12a, a first wall 12b extending in a first direction from the base portion to define second cavity 12c, and a second wall 12d extending in a second direction from the base portion to define a third cavity 12e. In particular embodiments, body portion 12 also includes a peripheral shoulder 12f extending adjacent an outer surface of first wall 12b. Shoulder 12f part of base portion 12a adjacent the shoulder are adapted for the seating of an o-ring or other suitable resilient seal 20 in contact therewith, to prevent the escape of generated gases from the gas generating system. Second cavity 12c is configured for receiving a known booster 148 material therein (see FIG. 3).

In particular embodiments, body portion 12 is formed from a moldable material or castable material (for example, a suitable polymer material or castable zinc alloy), and embedding or enclosure of initiator receiving portion 14 within body portion 12 is achieved by insert molding or casting at least part of the initiator receiving portion 14 within the body portion. As used herein, the term "moldable material" is defined as any material that can be formed into a molded part of casting using a mold. As used herein, a casting is understood to be a metal part formed in a mold.

Referring to FIG. 5, in another particular embodiment, the body portion 112 is formed from multiple pieces (for example, a first portion 99 and a second portion 101) which are brought into proximity to each other or into contact with each other to enclose at least a portion of initiator receiving portion 14 therein. The pieces 99 and 101 of the body portion are then affixed to each other (and to initiator receiving portion 14, if desired) using a snap fit, ultrasonic welding, adhesive application, and/or any other suitable process.

In a particular embodiment, body portion 12 is formed from a polymer material and first wall 12b or another part of body portion 12 includes one or more portions adapted to be melted, reflowed, or otherwise permanently deformed over a portion of the initiator, to engage and retain the initiator within cavity 14c of the initiator receiving portion 14. Processes such as heat-staking, for example, may be used to deform a polymer body portion material.

In a particular embodiment, as shown in FIG. 3, a peripheral edge and/or other parts of the body portion 12 are configured to be engageable by portions of a gas generating system housing when the initiator housing assembly is positioned within or mounted on the system housing. The initiator housing assembly may then be secured to the system housing to serve as an end closure for closing and sealing the system housing. Body portion 12 may be secured to the gas generator housing by crimping a portion of the housing over a periphery of the body portion, as shown in FIG. 3. Other means of securement may also be used. A groove may be formed in the body portion for receiving an O-ring or other resilient seal positioned between the end closure and the system housing to hermetically seal the gas generating system.

Alternatively, an initiator housing assembly in accordance with an embodiment of the present invention may be affixed to a separate end closure which is then attached to the system housing using known methods.

In cases where the body portion is formed from a castable metallic alloy, the body portion may be designed so that one or more parts of the body portion are deflectable so as to engage a portion of the initiator, to retain the initiator within cavity 14c.

The initiator receiving portion 14 is the portion of the housing assembly in which the initiator is received and secured. In the embodiment shown in FIGS. 1 and 2, initiator receiving portion 14 is a preformed member including a base portion 14a and a wall 14b extending in a first direction from base portion 14a to define first cavity 14c. Thus, in the embodiment shown in FIG. 1, wall 14b resides within second cavity 12b formed by the body portion 12. As used herein, the term "preformed" is understood to mean that the initiator receiving portion is formed as a separate part (or parts) prior to fabrication of the initiator housing assembly.

Cavity 14c is configured for receiving and retaining therein a known initiator (not shown), for use in igniting a gas generant material positioned within a gas generating system housing in which initiator housing assembly 10 is also mounted. In an alternative embodiment, the wall 14b extending from base portion 14a projects in an opposite direction from that shown in FIGS. 1 and 2. In this embodiment, the initiator receiving portion wall no longer resides within second cavity 12b, but an opening 14r leading from cavity second 12b into cavity 14b resides within second cavity 12b. This opening 14r leads into first cavity 14b in which the initiator is positioned and secured.

In another alternative embodiment, wall 14b is omitted, and the initiator is positioned and the chamber in which the initiator is positioned and secured is defined by the through opening 14r formed in base portion 14a. Also, in another particular embodiment, the initiator receiving portion 14 is formed from a metallic material.

Initiator receiving portion 14 may include openings or cavities into and through which the moldable or castable material of body portion 12 flows, to secure the initiator receiving portion 14 to the base portion when the moldable material cools and/or hardens. Other methods of securing the initiator receiving portion 14 to the base portion may also be used, including adhesive application, enclosing or encapsulating a portion of the initiator receiver within the body portion, and other suitable methods depending upon the requirements of a particular application.

In a particular embodiment, wall 14b or another portion of initiator receiving portion 14 includes one or more portions that are bendable or deformable using a crimping operation or other procedure, to engage and retain the initiator within cavity 14c.

In another particular embodiment, initiator receiving portion 14 includes a portion designed to protrude from body portion 12 or remain uncovered by body portion 12. This uncovered portion of the initiator receiving portion is configured to be welded or otherwise suitably attached to a gas generator housing (for example, a metallic housing). This secures the initiator housing assembly 10 to the gas generating system housing. In this embodiment, the initiator housing assembly may act to hermetically seal an end of the gas generating system housing.

Referring to FIG. 3, in another particular embodiment, initiator receiving portion 14 is in the form of a two-part sub-assembly including a plate portion 14d formed from a relatively thicker piece of material, and an initiator receiving member comprising a formed part 14e fabricated from a relatively thinner piece of material incorporating base portion 14a, wall 14b, and cavity 14c. Formed part 14e abuts and is supported by plate portion 14d. Plate portion 14d abuts formed part 14e to provide structural support for the relatively thinner formed part 14e, and to enhance the rigidity or stiffness of the formed part. The plate portion 14d and the relatively thinner formed 14e part may be positioned with respect to each other as desired. Then, both parts may be attached to body portion 12 in a manner previously described (for example, by insert molding the plate portion and the formed part into a polymeric body portion). Alternatively, formed part 14e may be attached to plate portion 14d by welding, crimping, or other suitable means. Then the pre-attached plate portion and formed part sub-assembly is attached to (or incorporated into) body portion 12 in a manner previously described. The elements of the initiator receiving portion 14 may be formed from metallic materials or any other materials suitable for the purposes and fabrication processes described herein.

Referring again to FIG. 3, an initiator assembly may be formed by securing a conventional initiator 48 in initiator housing assembly 10. Initiator 48 is used for igniting a gas generant composition contained in the gas generating system. One exemplary initiator construction is described in U.S. Pat. No. 6,009,809, incorporated herein by reference. Initiator 48 may be inserted axially into cavity 14c, thereby seating the initiator within the cavity. The initiator may then be secured within the cavity using any of a variety of methods known in the art, including crimping, adhesive application, etc, as previously described. In a particular embodiment, initiator 48 is in contact with initiator receiving portion wall 14b when the initiator is positioned within the cavity 14c.

Referring again to FIG. 3, initiator housing assembly 10 and an associated initiator 48 may be incorporated into a gas generating system 50. In the embodiment shown in FIG. 3, the gas generating system includes an outer housing 112, a booster cup 125, a booster material 148 positioned in cavity 12c (FIG. 1) formed in body portion 12, an inner housing 22, a gas generant material 60 positioned within the inner housing, a filter 70, and an end closure 80 affixed to an end of the outer housing.

Outer housing 112 is substantially cylindrical and has a pair of opposed ends and a wall extending between the ends to define a housing interior cavity. A longitudinal axis L extends along the length of the housing. Housing 112 may be extruded, roll-formed, or otherwise fabricated from a metal, metal, alloy, or any other suitable material.

A quantity of an ignition compound 148 is contained within cavity 12c so as to enable fluid communication with the initiator 48 after activation of the initiator. In the embodiment shown in FIG. 3, ignition compound 148 is a known or suitable ignition or booster compound, whose combustion ignites main gas generant charge 60. One or more autoignition tablets (not shown) may be placed in cavity 12c, allowing ignition of ignition compound 148 upon external heating of the gas generating system, in a manner well-known in the art.

A booster cup 125 is positioned over body portion wall 12b to cover opening 12r leading into cavity 12c and retain booster material 148 therein. Booster cup 125 has a base portion, a generally cylindrical first wall extending from the base portion, and a flange extending from the wall. The booster cup wall is dimensioned to receive body portion wall 12b therein. The booster cup base portion has an orifice formed therein to enable fluid communication between body portion cavity 12c and an exterior of the booster cup after activation of the gas generating system. This fluid communication enables transfer of booster material combustion products to the gas generant, for igniting the gas generant. Booster cup 125 may be stamped, cast, drawn, or otherwise formed from carbon steel, stainless steel, or any other suitable material.

Incorporation of the cavity 12c into the body portion 12 enables redetermined quantity of booster material to be positioned in the cavity so as to enable fluid communication with the initiator after initiator activation. This booster material hen be sealed in cavity 12c by .booster cup 125, thereby providing a self-contained initiator assembly including a booster material and that can be stored and transported independently of the other elements of the gas generating system.

An inner housing 22 is inwardly radially spaced from outer housing 112 and is substantially coaxially oriented along longitudinal axis L of the outer housing. Inner housing 22 has an elongate, substantially cylindrical body defining an interior cavity for containing therein gas generant material 60 (described below). The interior cavity serves as a combustion chamber for the gas generant 60. An end portion of inner housing 22 forms an interference fit with a cavity formed in filter 70, to aid in positioning the inner housing.

Inner housing 22 has a plurality of spaced-apart gas exit apertures 22d extending therealong to enable fluid communication between the interior cavity of the inner housing and an exterior of the inner housing. Each of apertures 22d may covered with a rupturable, gas-tight seal or shim (not shown) to seal the aperture. Inner housing 22 may be deep-drawn or otherwise suitably formed from carbon steel, stainless steel, or another suitable material.

Referring again to FIG. 1, a quantity of a propellant or gas generant material 60 is contained within the inner housing for production of gases when ignited by igniter booster material combustion products. Gas generant 60 may be in any of a variety of forms, for example tablets, stacked wafers, or in granulated form. Gas generant material 60 may be formulated by known methods, and in one embodiment is exemplified by "smokeless" gas generant compositions as described in U.S. Pat. Nos. 5,872,329, 6,074,502, 6,287,400, 6,306,232 and 6,475,312 incorporated by reference herein. As used herein, the term "smokeless" should be generally understood to mean such propellants as are capable of combustion yielding at least about 90% gaseous products based on a total product mass; and, as a corollary, no more than about 10% solid products based on a total product mass. However, the present invention is not limited to the use of smokeless gas generant compositions therein.

A filter 70 is positioned within housing 112 for filtering particulates from gases generated by combustion of gas generant 60. The filter may be formed from any of a variety of materials (for example, a carbon fiber or metallic mesh or perforated sheet, or a compressed knitted metal wire) known in the art for filtering gas generant combustion products. Suitable metallic mesh is readily obtainable from suppliers such as Wayne Wire, Inc., of Kalkaska, Mich. Suitable compressed knitted metal wire is commercially available from vendors such as Metex Corp. of Edison, N.J.

An end closure 80 is secured to an end of the outer housing opposite the initiator assembly, using one or more known methods, such as crimping or welding. End closure 80 includes one or more openings 80a for releasing generated gases from an interior of the outer housing. An O-ring or other resilient seal (not shown) may be positioned between the end closure and the outer housing to hermetically seal the gas generating system.

End closure 80 may be formed by an embodiment o the initiator housing assembly as previously described, or the end closure may be separately formed and coupled to the initiator housing assembly prior to attachment to the gas generating system housing. When formed as a separate part, end closure 80 may be stamped, cast, machined, or otherwise formed from carbon steel, stainless steel, or any other suitable material.

Referring now to FIG. 4, in one possible application of the initiator housing assembly described herein, an embodiment of the initiator housing assembly is incorporated into a gas generating system 50 which is part of an airbag system 200. Airbag system 200 includes at least one airbag 202 and a gas generating system in accordance with one of the embodiments described herein. The gas generating system 50 is coupled to the airbag so as to enable fluid communication with an interior of the airbag upon activation of the gas generating system. System 200 may be in communication with a crash event sensor 210 that includes (or is in operative communication with) a crash sensor algorithm (not shown) which signals activation of airbag system 800 via, for example, activation of igniter 48 (not shown in FIG. 4) in the event of a collision.

Referring again to FIG. 4, an embodiment of the initiator housing assembly or an airbag system including an embodiment of the initiator housing assembly may be also incorporated into a broader, more comprehensive vehicle occupant protection system 180 including additional elements such as a safety belt assembly 150. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 100 are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt 100 may be combined are described in U.S. Pat. Nos. 6,505, 790 and 6,419,177, incorporated herein by reference.

Safety belt assembly 150 may be in communication with a crash event sensor 158 (for example, an inertia sensor or an accelerometer) that includes (or is in operative communication with) a crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be appreciated that the various constituents described above are formed in known manners. For example, the various components may be molded. stamped or otherwise metal formed from carbon steel, aluminum, metallic alloys, or any of a variety of polymers.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. An initiator housing assembly comprising:
a preformed initiator receiving portion including a wall defining a first cavity; and
a body portion affixed to the receiving portion such that the receiving portion and the body portion form a single part prior to positioning of an initiator in the initiator receiving portion, the body portion defining a second cavity, wherein the wall defining the first cavity extends into the second cavity to define a first opening leading from an exterior of the first cavity into the first cavity and positioned within the second cavity,
wherein the initiator receiving portion further defines a second opening leading from an exterior of the first cavity into the first cavity, wherein the body portion also defines a third cavity, and wherein the second opening is positioned within the third cavity.

2. The housing assembly of claim 1 wherein the initiator receiving portion is formed from a metallic material.

3. The housing assembly of claim 2 wherein at least a portion of the initiator receiving portion is bendable for crimping over an initiator positioned within the initiator receiving portion.

4. The housing assembly of claim 1 wherein the body portion is formed from a moldable material.

5. The housing assembly of claim 4 wherein the body portion is molded onto the initiator receiving portion.

6. The housing assembly of claim 1 wherein the body portion is formed from multiple pieces comprising at least a first portion and a second portion adapted for coupling to the first portion to enclose at least part of the initiator receiving portion therebetween.

7. The housing assembly of claim 1 wherein the initiator receiving portion comprises an initiator receiving member and a stiffening member coupled to the initiator receiving member.

8. An initiator assembly comprising:
   an initiator housing assembly in accordance with claim 1; and
   an initiator positioned within the first cavity.

9. The initiator assembly of claim 8 further comprising a booster material positioned within the second cavity so as to enable fluid communication with the initiator after activation of the initiator.

10. The initiator assembly of claim 9 further comprising a booster cup coupled to the body portion so as to cover an opening leading into the second cavity.

11. A gas generating system comprising an initiator housing assembly in accordance with claim 1.

12. A vehicle occupant protection system comprising an initiator housing assembly in accordance with claim 1.

13. The housing assembly of claim 1 wherein the initiator receiving portion is affixed to the body portion such that at least a portion of the initiator receiving portion is embedded in the body portion.

14. An initiator housing assembly comprising:
   an initiator receiving portion defining a cavity, a first opening connecting an exterior of the cavity with the cavity, and a second opening connecting an exterior of the cavity with the cavity, the second opening being smaller than the first opening; and
   a body portion coupled to the receiving portion and defining a first body portion cavity connecting an exterior of the first body portion cavity with the first receiving portion opening, and a second body portion cavity connecting an exterior of the second body portion cavity with the second receiving portion opening, wherein at least a portion of the receiving portion separates the first and second body portion cavities,
   wherein the body portion is structured such that an initiator received in the initiator receiving portion must be inserted into the first body portion cavity and must enter the cavity through the first receiving portion opening.

15. The housing assembly of claim 14 wherein the first body portion cavity is structured for receiving a booster material therein.

16. The housing assembly of claim 15 wherein the body portion includes a wall enclosing a portion of the initiator receiving portion therein.

17. The housing assembly of claim 14 wherein the initiator receiving portion includes a base and a wall extending from the base to define a cavity structured for securement of an initiator therein.

18. An initiator assembly comprising:
   an initiator housing assembly in accordance with claim 14; and
   an initiator positioned within the initiator receiving portion.

19. A gas generating system comprising an initiator housing assembly in accordance with claim 14.

20. A vehicle occupant protection system comprising an initiator housing assembly in accordance with claim 14.

* * * * *

UNITED STATES PATENT AND TRADEMARK OFFICE
CERTIFICATE OF CORRECTION

| | | |
|---|---|---|
| PATENT NO. | : 8,172,262 B2 | Page 1 of 1 |
| APPLICATION NO. | : 12/618627 | |
| DATED | : May 8, 2012 | |
| INVENTOR(S) | : Mayville et al. | |

It is certified that error appears in the above-identified patent and that said Letters Patent is hereby corrected as shown below:

Col. 4, Line 60;    Delete "hen" and insert -- can then --

Col. 4, Line 60;    Delete "." before booster

Col. 5, Line 49;    Delete "o" and insert -- of --

Col. 6, Line 35;    Delete "." and insert -- , -- after molded

Signed and Sealed this
Seventh Day of August, 2012

David J. Kappos
*Director of the United States Patent and Trademark Office*